United States Patent
Wang et al.

(10) Patent No.: US 9,237,462 B2
(45) Date of Patent: Jan. 12, 2016

(54) SIGNALING DATA CHANNEL'S CONFIGURATION INFORMATION TO FACILITATE INTERFERENCE CANCELLATION

(71) Applicant: Telefonaktiebolaget L M Ericsson (publ), Stockholm (SE)

(72) Inventors: Yi-Pin Eric Wang, Fremont, CA (US); Johan Bergman, Stockholm (SE); Erik Dahlman, Bromma (SE); Stephen Grant, Pleasanton, CA (US); Stefan Parkvall, Stockholm (SE); Edgar Ramos, Espoo (FI); Andres Reial, Malmö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 189 days.

(21) Appl. No.: 13/824,763

(22) PCT Filed: Feb. 27, 2013

(86) PCT No.: PCT/SE2013/050178
§ 371 (c)(1),
(2) Date: Mar. 18, 2013

(87) PCT Pub. No.: WO2013/133751
PCT Pub. Date: Sep. 12, 2013

(65) Prior Publication Data
US 2014/0153499 A1      Jun. 5, 2014

Related U.S. Application Data

(60) Provisional application No. 61/606,785, filed on Mar. 5, 2012.

(51) Int. Cl.
*H04J 11/00* (2006.01)
*H04W 24/02* (2009.01)
(Continued)

(52) U.S. Cl.
CPC .................. *H04W 24/02* (2013.01); *H04B 1/10* (2013.01); *H04B 1/7097* (2013.01);
(Continued)

(58) Field of Classification Search
CPC .............. H04W 24/02; H04W 72/082; H04W 28/0236; H04W 28/048; H04W 28/042; H04W 36/20; H04W 40/16; H04W 52/0238; H04B 1/10; H04B 1/1027; H04B 1/7097; H04B 1/715; H04J 11/005
USPC ........ 370/329, 331, 252, 337; 455/63.1, 63.2, 455/63.3, 450, 501
See application file for complete search history.

(56) References Cited

U.S. PATENT DOCUMENTS

2007/0286124 A1    12/2007   Grant et al.
2009/0109939 A1*   4/2009    Bhushan et al. ............... 370/337
(Continued)

FOREIGN PATENT DOCUMENTS

EP    1 971 061 A1    9/2008
EP    2 180 748       4/2010
(Continued)

OTHER PUBLICATIONS

R1-111650, 3GPP TSAG RAN1 #65, "DL signaling to enhance MU MIMO operation", Barcelona, Spain, May 9-13, 2011 (2 pages).
(Continued)

*Primary Examiner* — Edan Orgad
*Assistant Examiner* — Ivan O Latorre
(74) *Attorney, Agent, or Firm* — Patent Portfolio Builders, PLLC

(57) ABSTRACT

In MU-MIMO scenarios, a target terminal can be exposed to data streams intended for other terminals. If the target terminal is capable of interference cancellation, then a network node, such as a base station or RNC, can provide the target terminal with interference information so that the target terminal can efficiently cancel interferences due to these interfering data streams. The interference information may include one or more interfering configuration, each of which characterizes a related interfering data stream. The interference information can also include the identity of the other terminal that is the intended recipient of the interfering stream. The network node may determine whether the target terminal can benefit from the interference information. If so, the network node can provide the interference information to the target terminal.

18 Claims, 15 Drawing Sheets

(51) Int. Cl.
*H04W 28/04* (2009.01)
*H04W 40/16* (2009.01)
*H04W 52/02* (2009.01)
*H04B 1/10* (2006.01)
*H04B 1/7097* (2011.01)
*H04W 72/08* (2009.01)
*H04W 28/02* (2009.01)

(52) U.S. Cl.
CPC .......... *H04J 11/005* (2013.01); *H04W 28/042* (2013.01); *H04W 40/16* (2013.01); *H04W 52/0238* (2013.01); *H04W 28/0236* (2013.01); *H04W 72/082* (2013.01)

(56) References Cited

U.S. PATENT DOCUMENTS

| | | | |
|---|---|---|---|
| 2009/0264142 A1* | 10/2009 | Sankar et al. | 455/501 |
| 2010/0190447 A1 | 7/2010 | Agrawal et al. | |
| 2010/0255852 A1* | 10/2010 | Chen et al. | 455/450 |
| 2010/0309861 A1* | 12/2010 | Gorokhov et al. | 370/329 |
| 2011/0130099 A1* | 6/2011 | Madan et al. | 455/63.1 |
| 2012/0026955 A1* | 2/2012 | Benjebbour et al. | 370/329 |
| 2012/0082022 A1* | 4/2012 | Damnjanovic et al. | 370/201 |
| 2012/0201162 A1* | 8/2012 | Kim et al. | 370/252 |
| 2012/0207025 A1* | 8/2012 | Barbieri et al. | 370/236 |
| 2013/0196701 A1* | 8/2013 | Tiirola et al. | 455/501 |

FOREIGN PATENT DOCUMENTS

| | | |
|---|---|---|
| EP | 2 280 492 A1 | 2/2011 |
| EP | 2 413 514 A1 | 2/2012 |
| WO | 2006/062356 A1 | 6/2006 |
| WO | 2010/141911 A2 | 12/2010 |

OTHER PUBLICATIONS

International Search Report and Written Opinion mailed Oct. 4, 2013 in International Application No. PCT/SE2013/050178 (13 pages total).

Inventors: Yi-Pin Eric Wang et al., U.S. Appl. No. 13/451,076, filed Apr. 19, 2012, "Signaling of Other-Cell Signal's Configuration Information to Facilitate Interference Cancellation at a Mobile Terminal".

International Search Report & Written Opinion w/cover sheet dated Dec. 20, 2013 in corresponding International Application No. PCT/SE2013/050019 (18 pages total).

EPO issued European Search Report/Supplementary European Search Report for Application No./Patent No. 13758398.5-1857 / 2823576, Feb. 25, 2015.

* cited by examiner

SIGNALING DATA CHANNEL'S CONFIGURATION INFORMATION TO FACILITATE INTERFERENCE CANCELLATION

This application is the U.S. national phase of International Application No. PCT/SE2013/050178 filed 27 Feb. 2013 which designated the U.S. and claims priority to U.S. Provisional Application No. 61/606,785 filed 5 Mar. 2012, the entire contents of each of which are hereby incorporated by reference.

RELATED APPLICATIONS

This application claims priority and benefit of U.S. provisional application 61/606,785 entitled "SIGNALING DATA CHANNEL'S CONFIGURATION INFORMATION TO FACILITATE INTERFERENCE CANCELLATION" filed on Mar. 5, 2012, which is incorporated herein by reference in its entirety. This application may also be related, at least in part, to U.S. application Ser. No. 13/451,076 entitled "SIGNALING OF OTHER-CELL SIGNAL'S CONFIGURATION INFORMATION TO FACILITATE INTERFERENCE CANCELLATION AT A MOBILE TERMINAL" filed on Apr. 19, 2012, which is incorporated herein by reference in its entirety.

TECHNICAL FIELD

The technical field of the present disclosure generally relates to interference cancellation in wireless communication systems. In particular, techniques to transmit configuration information to interference cancellation (IC) capable terminals are presented.

BACKGROUND

Mobile data traffic is projected to grow at a phenomenal rate in the years to come. To cope with such growth, cellular network operators and equipment vendors are exploring various technologies to significantly improve network capacity. Utilization of more radio spectrum, heterogeneous network (HetNet) deployment, cell site densification, and coordinated multiple-point (CoMP) transmission and reception are among the ones that are currently being explored.

Interference mitigation receiver is also a focus area. It can improve the network capacity of existing deployments. It can also maximize the benefit of HetNet and CoMP. A post-decoding successive interference cancellation (IC) receiver can achieve open-loop MIMO capacity under the condition of perfect per-layer rate control. A MIMO stream is detected and decoded first and then cancelled from the received composite signal before the next stream is detected.

The traditionally hard-decision based interference cancellation scheme has been extended to soft-decision based interference cancellation schemes. This allows cancellation to still be performed even when the previously decoded stream is not error free, e.g., when the per-layer rate control is not perfect. Soft symbol estimates can be formed based on the decoder output bit likelihood ratios (or bit log likelihood ratios). When the bit likelihood ratios are of high magnitudes, indicating strong confidence in the bit estimates, the soft symbol estimates are likely to be identical to, or in the vicinity of, the actual transmitted symbols. In such cases, interference contributed by these symbols can be very much cancelled. On the other hand, if the bit likelihood ratios are of low magnitudes, indicating weak confidence in the bit estimates, the soft symbol estimates will be in the vicinity of the origin, resulting in almost no cancellation.

Regardless of whether hard or soft decision based symbols are used in interference cancellation, forming interfering symbol estimates using the decoder outputs is an important aspect. This allows the quality of interference symbol estimates to be boosted by the coding gain. If the interfering symbols come from a MIMO stream intended for the same user equipment (UE) as seen in FIG. 1A, the UE 120 (of network 100) is informed of the interfering data stream's modulation and coding rate, so-called transport format (TF) or modulation and coding scheme (MCS). In this instance, post-decoding interference cancellation can readily be performed. In this Figure, a cell 130 is associated with the serving base station 110, and streams 1 and 2 are respectively assumed to be the desired and interfering data streams from the perspective of the UE 120.

However, in multi-user MIMO (MU-MIMO) scenarios, as illustrated in FIG. 1B, the interfering data stream is intended for another UE 122. In this figure, it is assumed that the UEs 120, 122 are co-scheduled UEs and data streams 1 and 2 are respectively intended for UE's 120 and 122. Thus, from the perspective of the UE 120, stream 2 is again the interfering stream. Since the interfering data stream is intended for another UE 122, the co-scheduled UE 120 does not have the knowledge of the TF or MCS used in the interfering data stream. It is therefore more difficult to cancel the interfering data stream. In LTE, the encoded bits of a physical data channel are scrambled by, or according to, an identity number associated with the intended UE. Thus, a descrambling step is needed before decoding. It is therefore more difficult to cancel the interfering data stream in the MU-MIMO case.

Severe inter-cell interference can be experienced by a UE 120 at a cell edge. Such interference can originate from different base stations as illustrated in FIG. 1C. In this Figure, it is assumed that the UE 120 is at an edge of the cell 130 being served by the base station 130 and the base station 130 is transmitting data stream 1 intended to the UE 120. It is also assumed that the base station 112 corresponding to a cell 132 is transmitting data stream 132 to its UE 122. Thus, again from the perspective of the UE 120, data stream 2 is an interfering stream. Like the case of MU-MIMO, the TF, MCS or UE ID of the interfering data stream is not known to the victim UE 120 at the cell edge.

The problem of inter-cell interference can be more pronounced in a range-expansion zone of a HetNet deployment as illustrated in FIG. 1D. In this Figure, the serving base station is the pico base station 110 associated with cell 130, which is within a cell 132 served by a macro base station 112. A range expansion zone 140, which is the striped area within the cell 130, represents a zone where the path loss to the macro base station 112 is higher than that to the closest pico base station 110 while the received power from the macro base station 112 is higher than that from the closest pico base station 110 due to large transmit power difference.

When the UE 120 is in the range-expansion zone 140, it can be beneficial to offload the traffic to the pico base station 110 as this allows the macro and other spatially isolated pico base stations to serve other UEs using the same radio resources (code, time and frequency allocation). However, the victim UE 120 in the range-expansion zone can be subject to severe interference from the macro base station 112 if one or more data streams (e.g., data stream 2) are transmitted by the macro base station 112.

For MU-MIMO and other-cell interference, it is beneficial to cancel the interfering data stream based on post-decoding symbol estimates. Such cancellation can provide dramatic throughput increases for an affected UE in many typical scenarios.

Without the knowledge of the TF, MCS or UE ID used in the interfering data stream, a victim UE has to detect this information blindly or through eavesdropping. However, the complexity of blindly detecting the coding rate is very high. Eavesdropping on the signalling channel carrying TF or MCS is also very difficult as such signalling channel is masked by the intended UE's identity, which is not known to the victim UE. The UE IDs may be inferred by using blind (hypothesis-testing) approaches, but the related complexity is again high and the detection robustness in environments with fast user turn-around may be low. Similarly, blindly inferring the UE ID from an LTE data channel is extremely difficult.

In addition to TF, MCS or UE ID, radio resource allocation parameters also need to be known. In high-speed packet access (HSPA), this includes the information about scrambling and channelization codes allocated to the interfering data stream, whereas in LTE, this includes the information about the radio resource elements (REs) allocated to the interfering data stream. Blindly detecting such radio resource allocation parameters is also extremely difficult.

In addition to blind detection complexity issues, obtaining the configuration information via eavesdropping is complicated by the fact that the downlink (DL) control channel for the other UE(s) may be received with insufficient signal-to-interference-and-noise ratio (SINR) by the victim UE, due to worse effective geometry and/or transmit power control (TPC) being applied to the control channel.

A base station can signal its current antenna configuration information to inactive UEs for facilitating channel quality indicator (CQI) estimation and has been proposed in Grant et al., US Publication 2007/0286124 A1 herein incorporated by reference in its entirety. According to Grant et al., such signaling is broadcasted. Furthermore, a special group identifier may be used to reach a group of mobile UEs. However, broadcasting antenna configuration information alone does not help much in facilitating interference cancellation at mobile UEs.

SUMMARY

A non-limiting aspect of the disclosed subject matter is directed to a method performed by a network node of a wireless network to provide configuration information of one or more interfering data streams to one or more wireless terminals. The method may comprise determining whether the target terminal will benefit from interference information, transmitting the interference information to the target terminal when it is determined that the target terminal will benefit from the interference information, and transmitting a plurality of data streams to one or more terminals in a cell being served by the network node. In the method, it may be assumed that for each data stream, the network node also transmits a corresponding configuration information that identifies air interface resources allocated to that data stream. An interfering stream may be viewed as a data stream intended for a terminal other than the target terminal, and an interfering configuration may be viewed as the configuration information corresponding to the interfering stream. The interfering configuration and/or an identity of the other terminal may be transmitted as the interference information.

Another non-limiting aspect of the disclosed subject matter is directed to a computer readable medium which includes programming instructions. When a computer of a network node executes the programming instructions, the computer executes a method to provide configuration information of one or more interfering data streams to one or more wireless terminals.

Another non-limiting aspect of the disclosed subject matter is directed to a network node of a wireless network. The network may be structured to provide configuration information of one or more interfering data streams to one or more wireless terminals. The network node may include a terminal manager, an interference information manager, a configuration manager, and a communicator. The terminal manager may be structured to determine whether the target terminal will benefit from interference information. The interference information manager may be structured to transmit the interference information to the target terminal when the terminal manager determines that the target terminal will benefit from the interference information. The configuration manager may be structured to transmit, for each of a plurality of data streams scheduled to be transmitted, a corresponding configuration information that identifies air interface resources allocated to that data stream. The communicator may be structured to transmit the data streams as scheduled to one or more terminals in a cell being served by the network node. An interfering stream may be viewed as a data stream intended for a terminal other than the target terminal, and an interfering configuration may be viewed as the configuration information corresponding to the interfering stream. The interference information manager may transmit the interfering configuration and/or an identity of the other terminal as the interference information.

Another non-limiting aspect of the disclosed subject matter is directed to a method performed by a wireless terminal capable of performing interference cancellation. The method may include receiving interference information from a network node, receiving a plurality of data streams transmitted from the network node including an interfering stream, canceling the interfering stream from the plurality of data streams based on the interference information. In the method, it may be assumed that for each data stream, the network node also transmits a corresponding configuration information that identifies air interface resources allocated to that data stream. The interfering stream may be viewed as a data stream intended for a terminal other than the target terminal, and an interfering configuration may be viewed as the configuration information corresponding to the interfering stream. The interference information may include the interfering configuration and/or an identity of the other terminal.

Another non-limiting aspect of the disclosed subject matter is directed to a computer readable medium which includes programming instructions. When a computer of an interference capable wireless terminal executes the programming instructions, the computer executes a method to cancel interferences as described above.

Another non-limiting aspect of the disclosed subject matter is directed to a target terminal structured to cancel interferences. The wireless terminal may include an interference information manager, a communicator, and an IC receiver. The interference information manager may be structured to receive interference information from a network node (300). The communicator may be structured to receive a plurality of data streams transmitted from the network node including an interfering stream. The IC receiver may be structured to cancel the interfering stream from the plurality of data streams based on the interference information. It may be assumed that for each data stream, the network node also transmits a corresponding configuration information that identifies air interface resources allocated to that data stream. The interfering stream may be viewed as a data stream intended for a terminal other than the target terminal, and an interfering configuration may be viewed as the configuration information corresponding to the interfering stream. The interference information may include the interfering configuration and/or an identity of the other terminal.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1A:
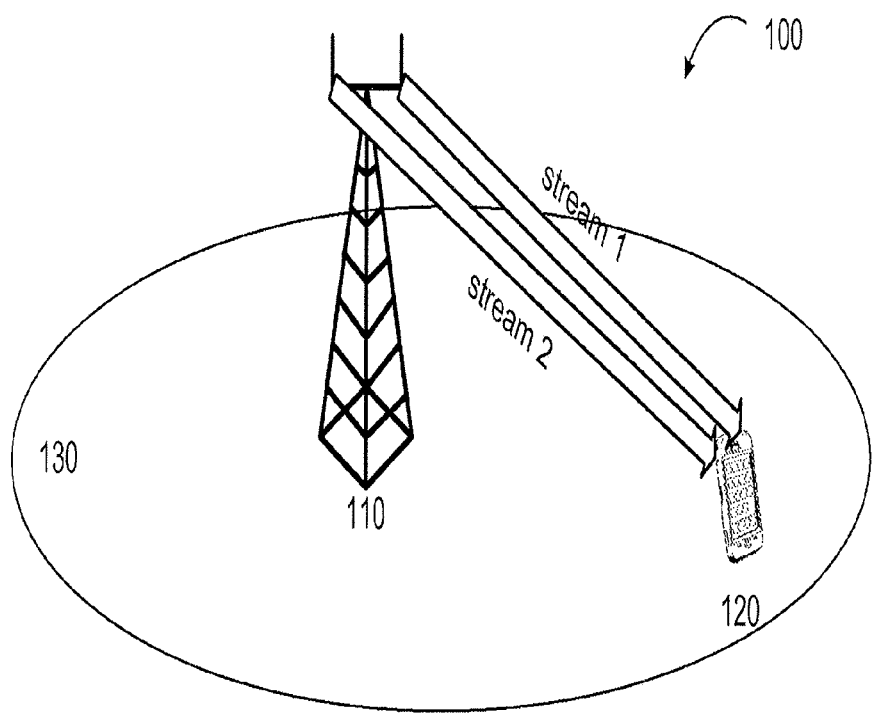
FIGS. 1A, 1B, 1C, 1D illustrate examples scenarios of interferences that can occur due to MIMO stream transmissions.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., WCDMA, HSPA, LTE—are used as examples for explanation purposes. Note that the technology described herein can be applied to non-3GPP standards, e.g., IS-95, cdma2000, 1xEVDO, etc. Thus, the scope of this disclosure is not limited to the set of 3GPP wireless network systems and can encompass many domains of wireless network systems. Also, a base station (e.g., RBS, NodeB, NB, eNodeB, eNB, etc.) will be used as an example of a network node in which the described method can be performed. However, it should be noted that the disclosed subject matter is applicable to any node of a network, such as relay stations or RNC, that facilitate communications with wireless terminals. Also without loss of generality, mobile terminals (e.g., UE, mobile computer, PDA, etc.) will be used as examples of wireless terminals that communicate with the base station.

Figure 1B:
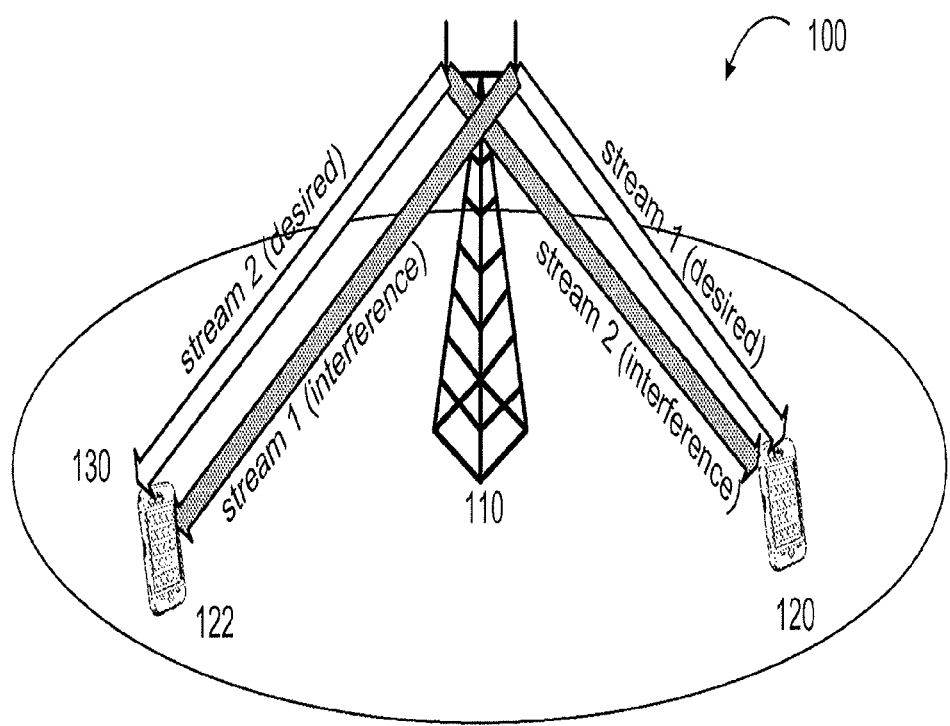
Figure 1C:
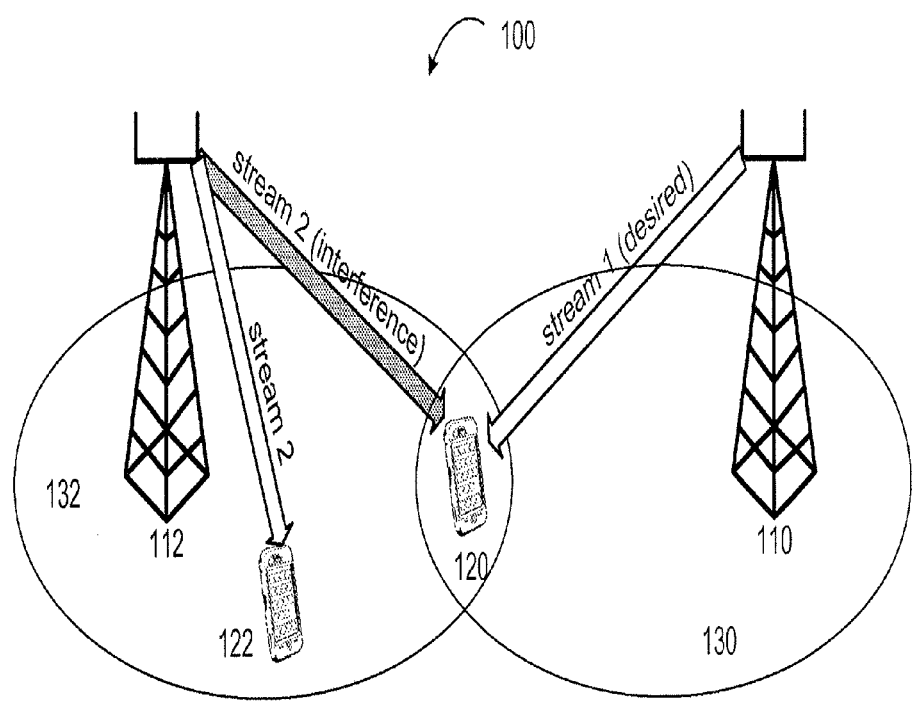
Figure 1D:
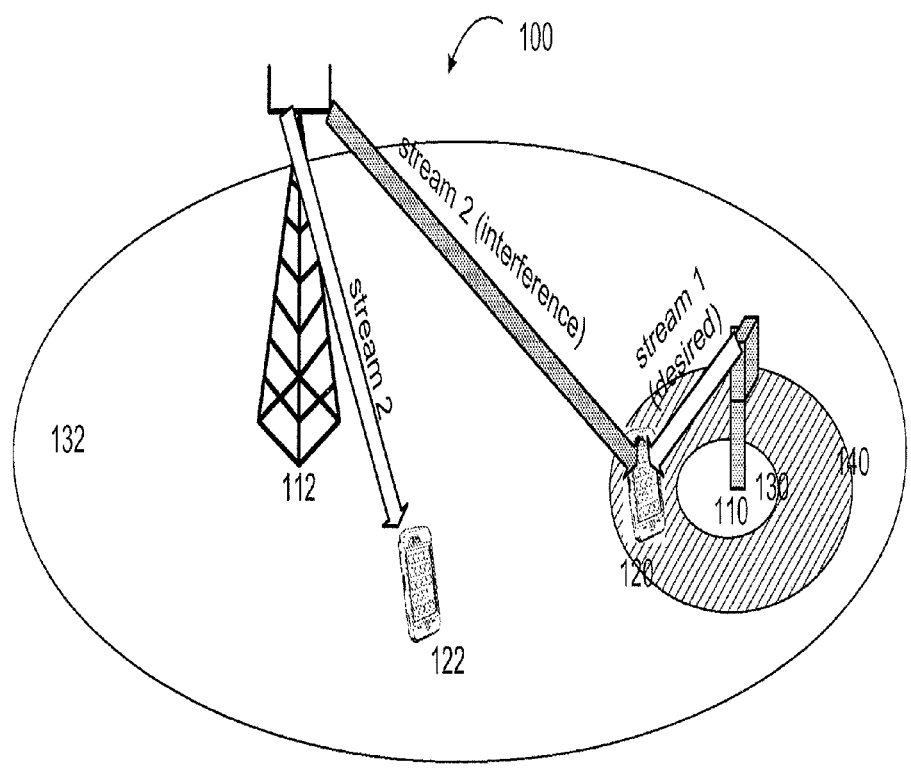

As indicated above, in multi-user MIMO (MU-MIMO) scenarios, as illustrated in FIGS. 1B, 1C and 1D, an interfering data stream may be viewed as a data stream intended for another UE. Thus, a co-scheduled UE does not have the knowledge of the TF, MCS or UE ID used in the interfering data stream. It is therefore more difficult to cancel the interfering data stream. In LTE, the encoded bits of a physical data channel are scrambled by, or according to, an identity number associated with the intended UE. Thus, a descrambling step is needed before decoding. It is therefore more difficult to cancel the interfering data stream in the MU-MIMO case.

In this disclosure, "configuration information" may generally include parameters that allow a data stream to be decoded. The configuration corresponding to the data stream may identify air interfaces allocated to the data stream. As an illustration, the configuration information can include TF, MCS, UE ID, and radio resource allocation parameters. Other parameters may be included in the configuration information, e.g., UE category, transport block size, MIMO rank and precoding information, antenna power allocation, HARQ redundancy version, etc. The transport block size may be provided as an index. The UE category information may be needed in some cases to translate the transport block size index to the actual transport block size.

Signaling information to UEs for facilitating interference cancellation in a device-to-device communication scenario has been proposed before. For typical cellular communication scenarios, solutions for facilitating inter-cell interference cancellation at the UE have also been proposed before. For example, a serving eNB can signal to its own scheduled UEs a list of IDs corresponding to the co-channel UEs in neighboring cells. A scheduled UE can then use such a list in an attempt to decode the control channels sent in the neighboring cells. The search space of the unknown UE IDs used in neighboring cell's control signals can be reduced significantly. Nonetheless, the disadvantages of this solution include higher complexity due to the trial-and-error search process. Furthermore, neighboring cell's control signals may not be audible.

The disclosed subject matter addresses some or all of the issues described above with respect to the conventional solutions. Conventionally, configuration information of a data stream intended for a UE is hidden from other UEs by masking the data stream with the ID of the target UE.

Figure 2A:
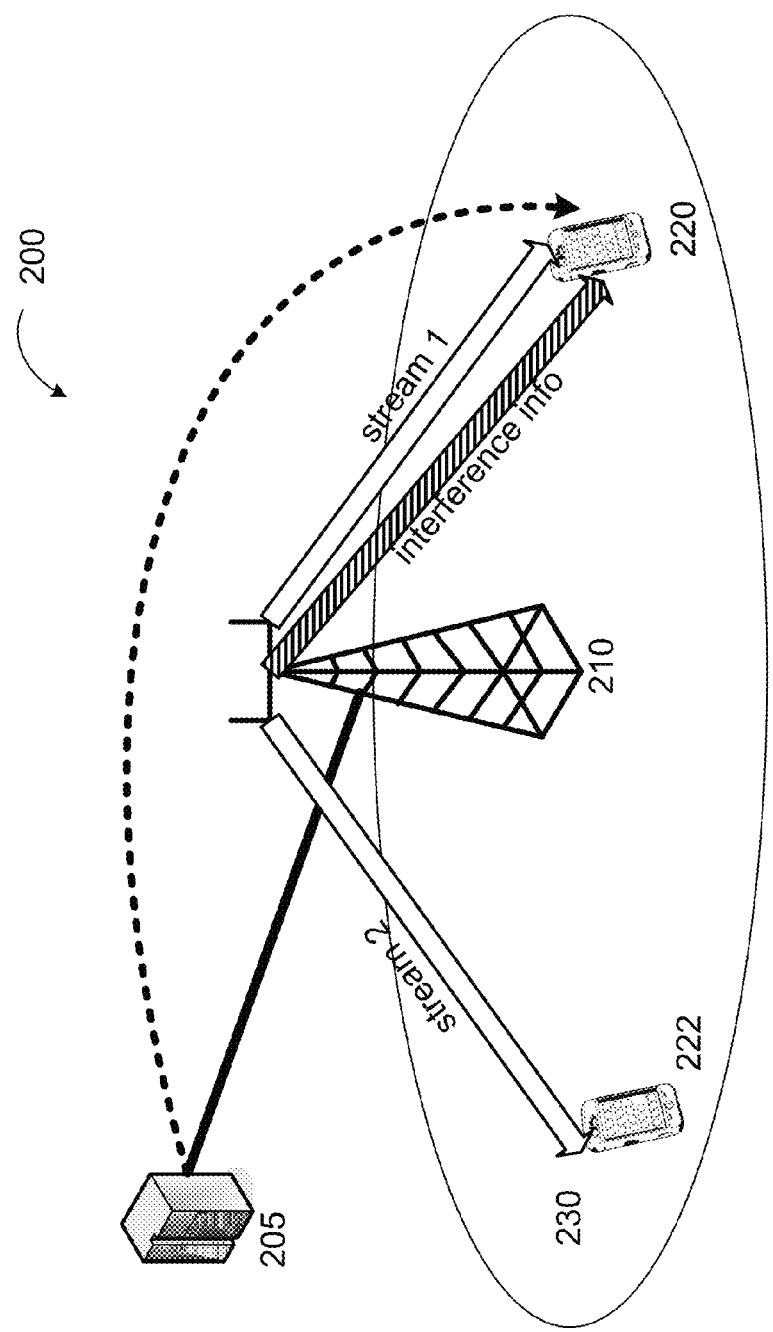
FIGS. 2A, 2B, 2C, 2D illustrate example scenarios in which a mobile terminal may be informed of configuration information of interfering data streams.

But in one or more non-limiting aspects of the disclosed subject matter, a network node may make such configuration information available to a terminal (e.g., a UE) other than the intended terminal as illustrated FIG. 2A. In the figure, there are two terminals 220 and 222 (e.g., UEs) within a cell 230 being served by a base station 210. It may be assumed that data stream 1 is intended for the terminal 220. That is, the terminal 220 is the target terminal in relation to the data stream 1. Data stream 2 intended for the terminal 222 is a source of interference for the target terminal 220. From the perspective of the target terminal 220, the data stream 2 intended for the other terminal 222 is an interfering stream. To minimize clutter, the interfering stream 2 from the base station 210 to the target terminal 220 is not drawn.

As seen, the base station 210, which is an example of a network node, may provide interference information to the target terminal 220. The interference information may include one or both of an interfering configuration and an identity of the other terminal 222. In this context, the interfering configuration is used to refer to the configuration information corresponding to the interfering stream. When the other terminal's 222 identity is provided in the interference information, the target terminal 220 may cave drop to determine the interfering configuration even if the interfering configuration itself is not provided.

The target terminal 220, having knowledge of the interfering configuration, may then cancel interferences due to the interfering data stream, i.e., perform interference cancellation (IC) based on the interfering configuration. In an alternative, an RNC 205, which is another example of a network node, may provide the interference information to the target terminal 220 via the base station 210.

Currently in HSPA systems, the configuration information is signaled through HS-SCCH. An identifier (ID) associated with the intended mobile terminal is used as a mask to scramble the part 1 field and the CRC bits. Thus, only the intended terminal is able to read the content of HS-SCCH.

Figure 2B:
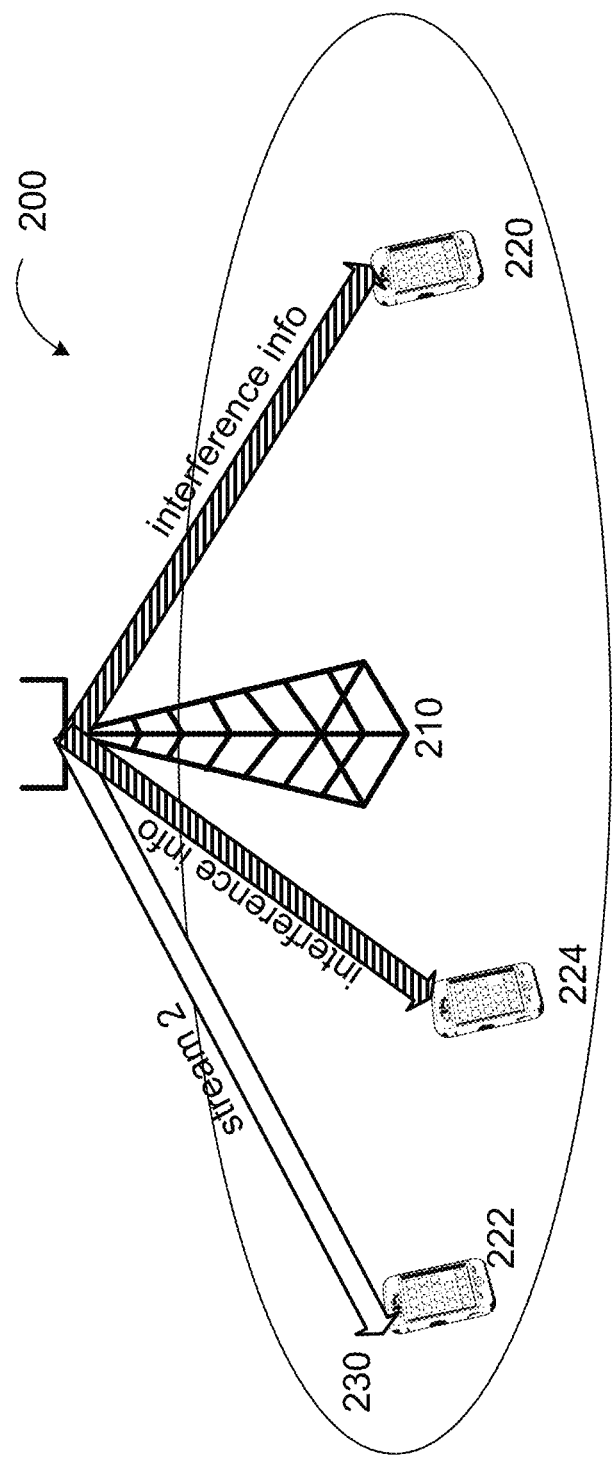

But in a non-limiting embodiment, to facilitate interference cancellation at the non-intended mobile terminals (e.g., the target terminal 220), the network node (e.g., the base station 210) can broadcast the same content of HS-SCCH (an example of a shared control channel) using a special ID. In a broadcast, the content is packaged such that a plurality of mobile terminals may read the content. This is illustrated in FIG. 2B. As seen, the interference information is broadcasted and is understood by the target terminal 220 as well as by a third terminal 224. This special ID may be viewed as a group ID shared by all the mobile terminals that can benefit from such information. The special ID can also serve a notification function to indicate that the configuration information signalled in the HS-SCCH is about an interfering data stream.

This is to be differentiated from where the HS-SCCH is masked with one's own unique ID. This is an example of a unicast in which the configuration information signaled in the HS-SCCH is about the terminal's own data stream, and the configuration information is packaged such that only the intended recipient is able to read the contents.

In the broadcast, one implementation of this special group ID is the all-zero sequence. In this case, the HS-SCCH can be considered non-masked. In this approach, a given cell can send, i.e., transmit, two HS-SCCH messages with identical contents—one that is power controlled and masked, the other that is non-power controlled (or boosted) and unmasked.

The HS-SCCH intended to benefit the target terminal 220 may be specifically power controlled according to the target terminal's 220 channel condition. This can work well when the system knows there is one (or few) mobile terminals that may benefit from such additional information. A target terminal 220 may be in the same or different cells.

The interfering configuration signaled in the HS-SCCH can include a transport block size index. The translation of this index to the actual transport block size depends on the category of the intended terminal, i.e., the category of the other terminal 222. If the network coordinates scheduling decision to schedule mobile terminals of the same terminal category at the same time, the target terminal 220 will have the correct information about an interfering signal's actual transport block size by translating the transport block size index using its own transport block index to size mapping table. Otherwise, additional information about the other terminal 222 category can be provided in the special HS-SCCH about interfering configuration.

In yet another embodiment, instead of duplicating the same configuration information in another HS-SCCH, the network node (e.g., base station 210, RNC 205) can signal the IDs of the scheduled terminals (which includes the other terminal 222) in a signal channel different from the HS-SCCH, i.e., different from the shared control channel conventionally used by the network node to transmit the configuration information to the scheduled terminals. This signal channel may be broadcast or power-controlled according to the radio channel conditions of one or more mobile terminals.

With the ID information about the other scheduled terminals, an IC capable receiver can attempt to eavesdrop on the HS-SCCHs intended for other terminals and obtain the configuration information to facilitate interference cancellation. In this approach, a power controlled and masked HS-SCCH message together with a new signal channel carrying the terminal ID message can be transmitted. As discussed earlier, depending on scheduling coordination, the new signal channel may further include information about terminal category associated with the interfering data stream.

Regardless of whether transmitted information is a duplicated HS-SCCH message with a different mask or information about the terminal ID and terminal category of scheduled mobile terminals, these are broadly referred to as "configuration information" in the continued description below. Note that in either case, the HS-SCCH reception conditions for the legacy terminals are not negatively affected.

Of course, the interference information may be transmitted whenever data are scheduled. But in an embodiment, the network node (e.g., the base station 210, RNC 205) may transmit the interference information only when there is at least one terminal in its own cell, or in neighboring cells, which may benefit from such information. For example, if none of the terminals in CELL_FACH or CELL_DCH states has an interference cancellation receiver, there is no point in spending precious radio resources on transmitting such configuration information for facilitating interference cancellation.

The knowledge about whether there is a beneficiary terminal (e.g., target terminal 220) in the neighboring cells may further help determine the transmit power level of the additional signalling. For example, if only own-cell MU-MIMO terminals will benefit from having the configuration information and there are no terminals with IC capable receivers in CELL_FACH or CELL_DCH states (generically "data states" or "active states") in the neighboring cells, the power level used to deliver the configuration information can be set only to reach the scheduled own-cell MU-MIMO terminals. For example, a predetermined power sufficient to reach the edge of an own cell 230 may be applied. However, if the beneficiary terminal is located in the neighboring cell 232, a predetermined power sufficient to reach into a portion of the neighboring cell 232 may be applied.

Figure 2C:
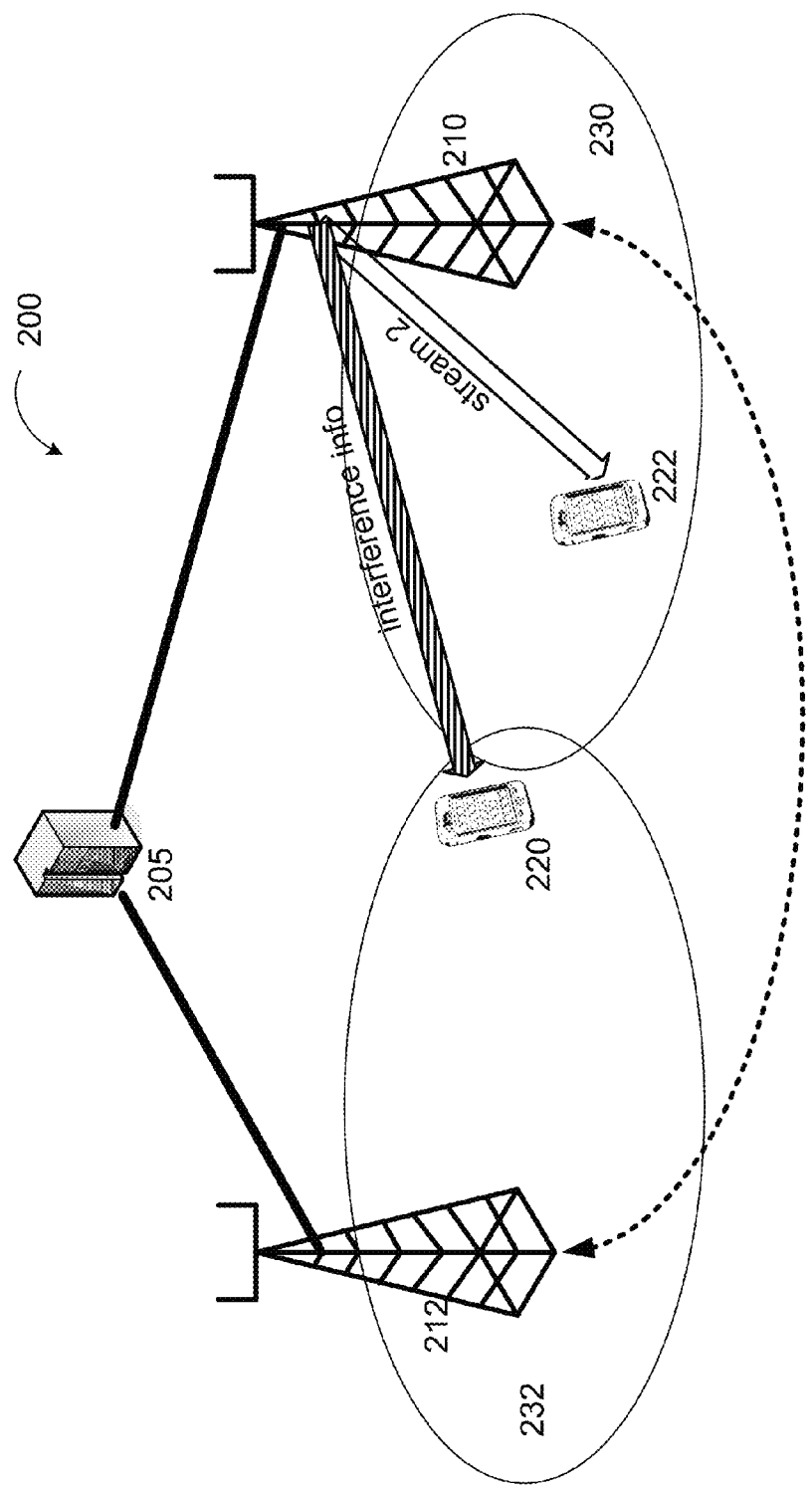

The information regarding whether there are IC capable terminals in CELL_FACH or CELL_DCH states may be exchanged between participating base stations as illustrated in FIG. 2C. In this figure, the target terminal 220 is located within a neighboring cell 232. That is, the neighboring base station 212 is the serving base station and the neighboring cell 232 is the serving cell to the target terminal 220. The neighboring base station 212 may provide and the base station 210 may receive information on the target terminal 220, e.g., over the x2 interface in LTE. In WCDMA, the coordination may be achieved through the RNC. The information may include the state (e.g., whether the target terminal 220 is in either the CELL_FACH or CELL_DCH state) and/or the IC capabilities. Alternatively, such information may be provided to the RNC 205.

In addition, certain pre-defined TTI's may be designated to schedule advanced interference cancellation mobile terminals. Only in these special TTIs, the base station involved with the coordination may transmit the configuration information of each one's transmitted data streams.

In one embodiment, the participating base stations may coordinate as to when the interference information may be transmitted. In another embodiment, the RNC 205 may instruct the participating base stations when to transmit the configuration information. In either a homogeneous or heterogeneous deployment, the RNC will have knowledge about whether or not a terminal is in soft handoff (SHO). If so, it is likely that this terminal may benefit from cancellation of other cell interferences. This knowledge can also be used to help the base stations involved determine when to transmit the configuration information regarding scheduled data streams.

The RNC may further instruct the participating base stations about how to set the power level for transmitting the configuration information. Furthermore, in the SHO case, if each base station reports E-DPDCH ACK/NACK to the RNC, the RBC can estimate a relative block error rate (BLER) between the multiple base stations to mobile terminal links. The relative BLER can then be translated to relative path loss, which can be used to help determine the power level for transmitting the configuration information.

In the current HSPA release (Rel-11), a mechanism does exist for instructing a mobile terminal to monitor an additional HS-SCCH from one non-serving cell belonging either to the current serving base station or to another base station. The situation that requires the terminal to monitor an HS-SCCH from a non-serving cell can arise when the RNC is preparing the mobile terminal and the non-serving cell for an enhanced serving cell change from the current serving cell to the mentioned non-serving cell.

The enhanced serving cell change mechanism was introduced in HSPA Rel-8 and is a complement to the ordinary serving cell change of earlier HSPA releases. In an ordinary serving cell change, the serving cell change command is transmitted as an RRC configuration message from the RNC via the source serving cell to the terminal. The enhanced serving cell change mechanism allows the RNC to preload the terminal with the RRC configuration information needed for a future serving cell change to one particular non-serving cell. When the RNC has preloaded the terminal with this information (via the source serving cell), the terminal will start monitoring one HS-SCCH in the non-serving cell which is the candidate target serving cell. If and when the RNC decides to perform the enhanced serving cell change to the candidate target serving cell, the candidate target serving cell transmits a particular HS-SCCH order which triggers the terminal to perform the serving cell change.

This indicates that the terminal that supports enhanced serving cell change is already capable of monitoring a HS-SCCH of a non-serving cell. In one aspect of the present invention, the existing HS-SCCH monitoring capability can be used to signal the configuration information about an interfering data stream or streams(s) from the base station to such capable terminals. The monitoring capability can be used even in scenarios where the terminal does not need to change the serving cell. Reuse of this HS-SCCH monitoring capability may facilitate a cost-efficient terminal implementation.

In an embodiment, control channel orders (e.g., new HS-SCCH orders) can be introduced that instructs a terminal to start/stop monitoring the interfering configuration transmitted in current or new cells about interfering streams. Instructing the mobile terminals to monitor additional HS-SCCHs only when needed helps to conserve terminal battery. The RNC can determine when such HS-SCCH orders should be transmitted, since the RNC might already determine when the interference information should be transmitted as described above. The monitoring pattern that the target mobile terminal 222 should follow could also be signaled.

Figure 2D:
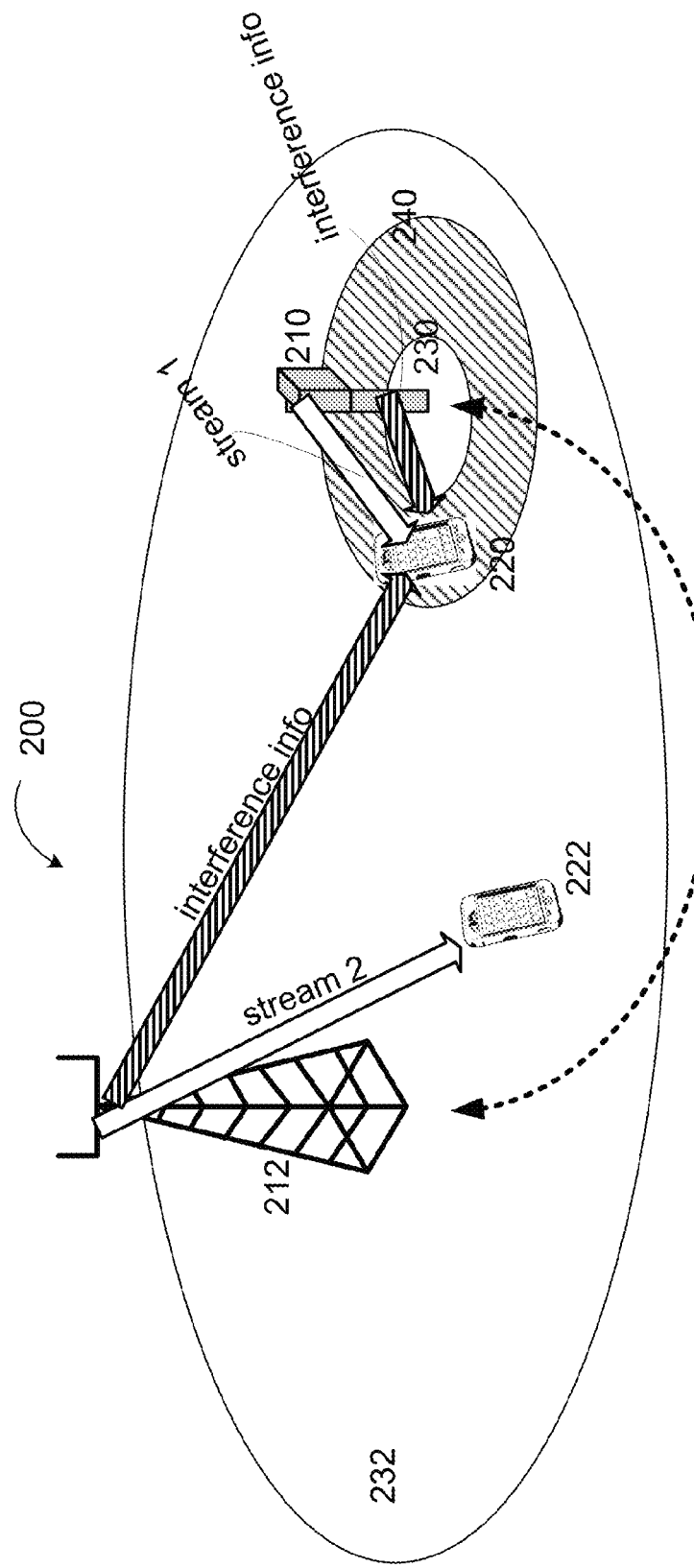

While HSPA scenarios have been used thus far, one or more of the concepts can be applied to other wireless communication scenarios. For example, in a range expansion zone of a LTE heterogeneous network, a terminal can be heavily interfered by the macro base station, e.g., macro base station as illustrated in FIG. 2D. This can be unlike HSPA in which the target terminal 220 may still be served by the macro base station 212. The serving base station 210, e.g., the micro/pico/femto eNB 210, may have knowledge of when the target terminal 220 is in the range expansion zone 240. Therefore, the pico base station 210 may indicate over an interface (e.g., the X2 interface) to the macro base station 212 that the target terminal 220 is potentially victim of inter-cell interference. Then the macro base station 212 may transmit the interference information on the PDCCH. Alternatively, the serving base station 210 may transmit the interference information, e.g., when the macro base station 212 is not transmitting on the same resource.

The use of PDCCH in LTE is similar to HS-SCCH in HSPA. The CRC bits of PDCCH can also be scrambled with an ID associated with the intended terminal. However unlike the HSPA case, in LTE the encoded bits in the data channel (PDSCH) are also scrambled by the scheduled terminal's identity. Then to decode the interfering stream, the target terminal 220 may need to use the ID of the terminal associated with the interfering stream, i.e., the ID of the other terminal 222, to descramble the originally scrambled codeword. Thus, though interfering signal's terminal ID may be optional in one scenario (e.g., in the case of HSPA), depending on which of the alternatives mentioned above is used, it may be necessary information for facilitating other-cell interference cancellation in other scenarios (e.g., in the case of LTE).

Similar to the approach of HS-SCCH order in HSPA, a special order can be sent in PDCCH from the serving cell to instruct an LTE mobile terminal to read the PDCCH from another cell. This can be termed "PDCCH order". Furthermore, the serving cell can signal PDCCH monitoring pattern using a special PDCCH order.

Figure 3:
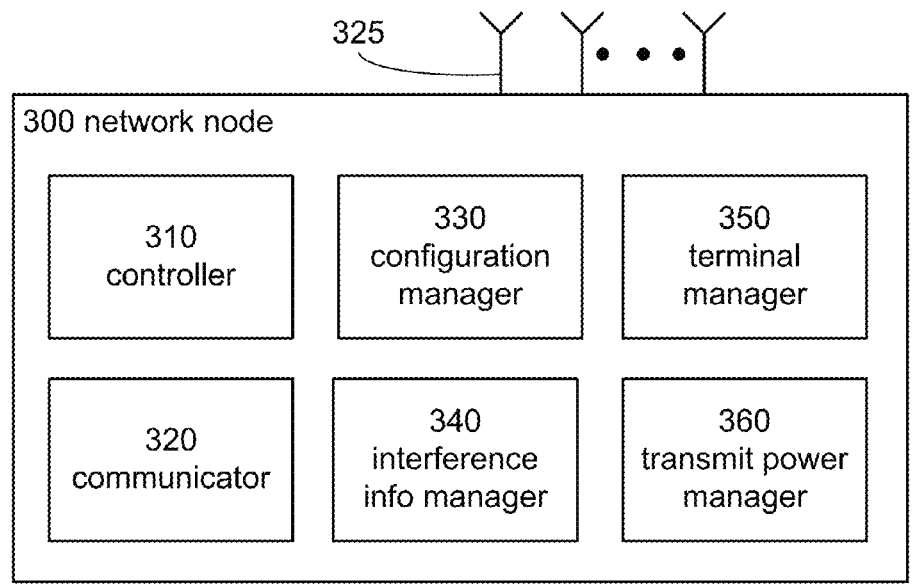
FIGS. 3 and 4 illustrate example embodiments of a network node.

FIG. 3 illustrates an example of a network node structured to provide communication services to one or more mobile terminals, including a target terminal 220. For example, when the target terminal 220 is IC capable, the network node may be structured to facilitate interference cancellation. The base station 210, 212 and the RNC 205 are just some examples of the network node 300. The network node 300 may comprise several devices including a controller 310, a communicator 320, a configuration manager 330, an interference information manager 340, a terminal manager 350, and a transmit power manager 360.

The communicator 320 may be structured to communicate with other network nodes including base stations, RNCs, and core network nodes. The communicator 320 may also be structured to communicate with mobile terminals. The configuration manager 330 may be structured to determine and manage configuration information corresponding to the data streams including interfering configuration corresponding to the interfering stream. The interference information manager 340 may be structured to determine and manage interference information. The terminal manager 350 may be structured to gather information on mobile terminals and determine, among others, whether one or more terminals may benefit from the interference information. The transmit power manager 350 may be structured to manage transmission powers applied in transmitting data streams, configuration information, interference information, and so on. The controller 310 may be structured to control an overall operation of the network node 300 including any coordination activities with other nodes. Examples of operations that may be performed by these devices will be described in conjunction with FIG. 5.

Figure 4:
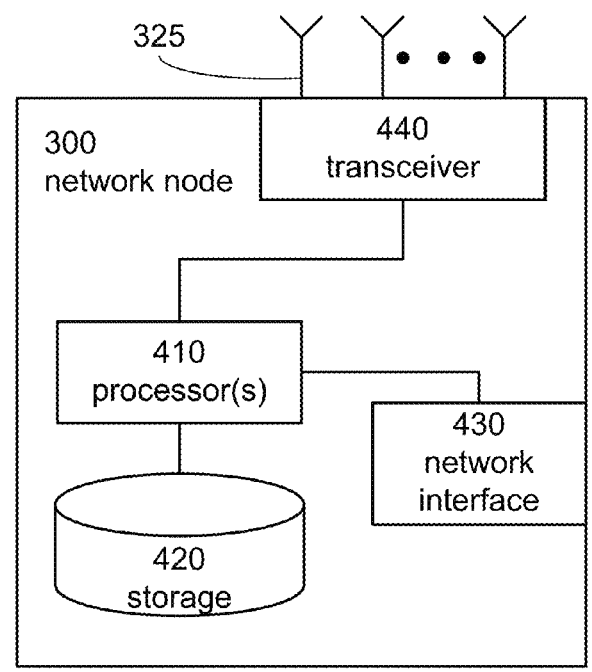

FIG. 3 provides a logical view of the network node 300 and the devices included therein. It is not strictly necessary that each device be implemented as physically separate modules or circuits. Some or all devices may be combined in a physical module. Also, one or more devices may be implemented in multiple physical modules as illustrated in FIG. 4.

The devices of the network node 300 need not be implemented strictly in hardware. It is envisioned that any of the devices maybe implemented through a combination of hardware and software. For example, as illustrated in FIG. 4, the network node 300 may include one or more processors 410 structured to execute program instructions stored in a non-transitory storage medium or in firmware (e.g., ROM, RAM, Flash) (denoted as storage 420) to perform the operations of the network node devices. The program instructions may also be received in a transitory manner, e.g., through externally provided signals. The transceiver 440 may be structured to receive signals from and send signals to one or more mobile terminals 220, 222 via one or more antennas 325. The transmitter and the receiver may be implemented as physically separate devices. The network node 300 may also include a network interface 430 to communicate with other network nodes including other base stations 210, RNC 205, and core network nodes.

Figure 5:
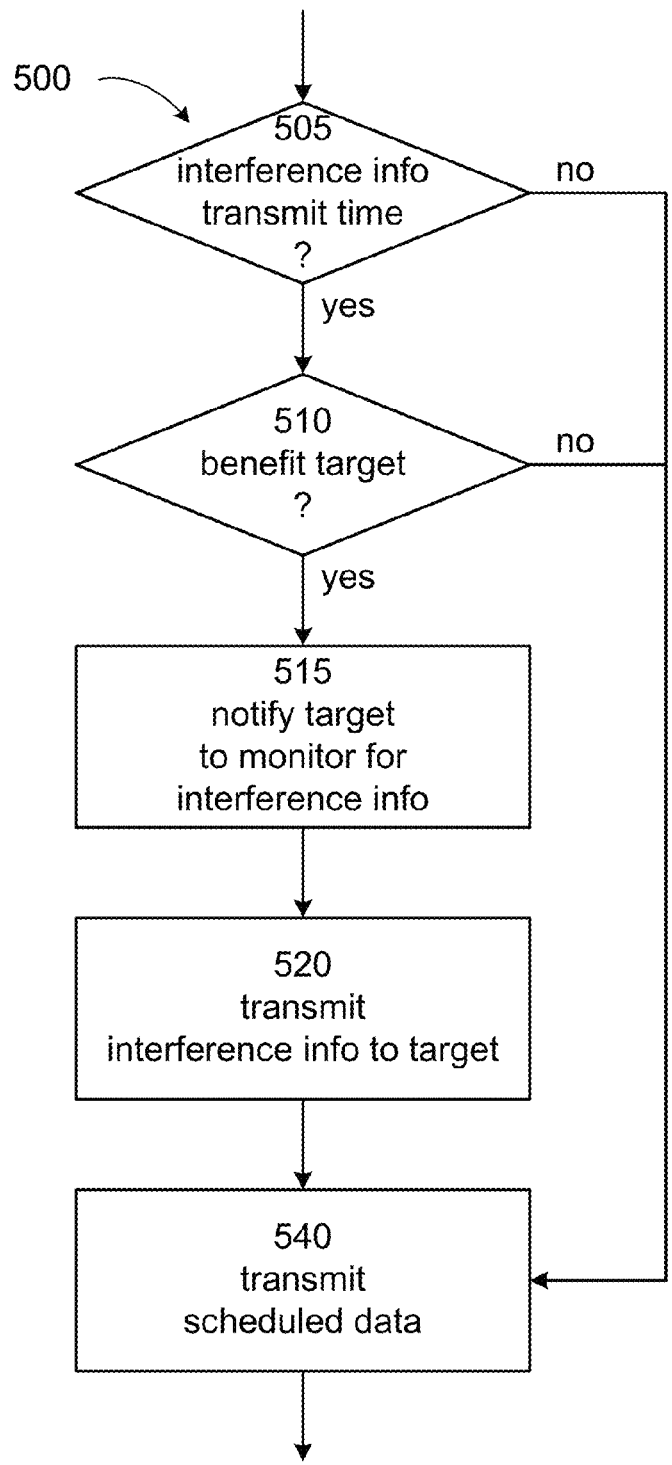
FIG. 5 illustrates a flow chart of an example method performed in a network node to facilitate interference cancellation at mobile terminal.

FIG. 5 illustrates a flow chart of an example method 500 performed by the network node 300 to provide communication services to the target terminal 220. For explanation purposes, the perspective of the target terminal 220 will be used. The method 500 may facilitate interference cancellation by the target terminal 220. In one embodiment, the base station 210 may perform the illustrated method 500. In another embodiment, the RNC 205 may perform the method via the base station 210. In yet another embodiment, the RNC and the base station 210 may cooperate.

In FIG. 5, it is assumed that the network node 300 transmits the configuration information corresponding to data streams scheduled to be transmitted to the intended mobile terminals in a conventional manner. In HSPA for example, the configuration manager 330 may perform the conventional operation of transmitting the configuration information of the scheduled data streams, including the interfering configuration of the interfering stream to the other terminal 222. As mentioned, the configuration information may identify air interface resources allocated to the corresponding data stream.

In step 510, the network node 300, and in particular the terminal manager 350, may determine whether one or more mobile terminals, including the target terminal 220, may benefit from the interference information. The mobile terminals included in the step 510 may correspond to intended recipients of data streams scheduled to be transmitted in step 540.

Figure 6:
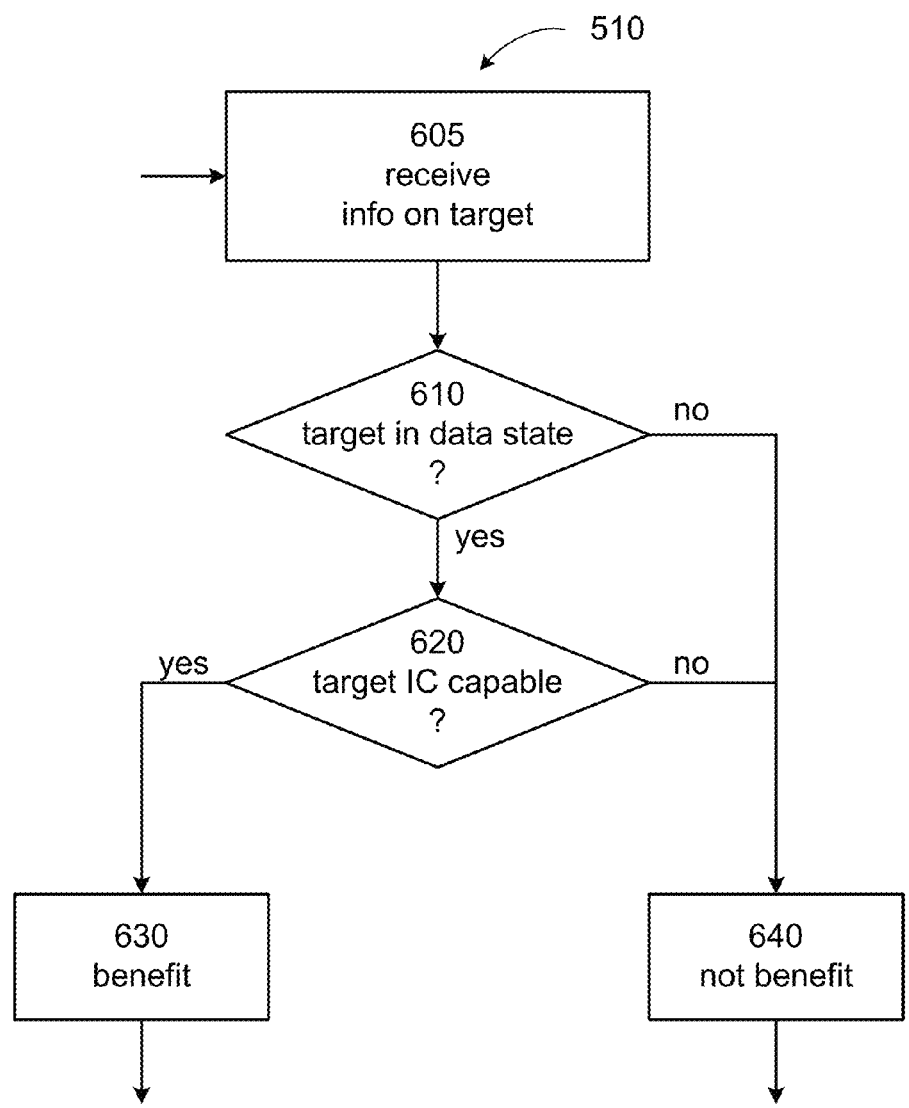
FIG. 6 illustrates a flow chart of an example process performed in a network node to determine whether a target terminal may benefit from interference information.

FIG. 6 illustrates a flow chart of an example process to implement the step 510. In step 610, the terminal manager 350 may determine whether any of the mobile terminals are in a data state. For example, the terminal manager 350 may determine whether or not the target terminal 220 is in a CELL_FACH or CELL_DCH state. For ease of reference, this will be referred to as the first condition. If it is determined that the first condition is not true for all mobile terminals, then in step 640, the terminal manager 350 may determine providing the interference information will not be beneficial to the mobile terminals including the target terminal 220.

However, if it is determined that the first condition is true for some of the mobile terminals, then in step 620, the terminal manager 350 may determine, from among the mobile terminals with the first condition being true, whether any of those mobile terminals is IC capable. Again for ease of reference, this will be referred to as the second condition. If it is determined that the second condition is true for any of the mobile terminals, then in step 630, the terminal manager 350 may determine that providing the interference information will may be beneficial. Otherwise, the terminal manager 350 may proceed to step 640. Note that the steps 610 and 620 may be performed in any order or even contemporaneously. It is only necessary to determine whether both conditions are true or not for any of the mobile terminals.

From the perspective of the target terminal 220 in particular, the terminal manager 350 may determine that the target terminal 220 will benefit in step 630 only when both the first and second conditions are true for the target terminal 220. Conversely, the terminal manager 350 may determine that the target terminal 220 will not benefit in step 640 when one or both of the first and second conditions are not true.

If the base station 210 is the serving base station for the target terminal 220 (e.g., see FIGS. 2A, 2B), the base station 210 or the RNC 205 controlling the serving base station will be aware of the state and capabilities of the target terminal 220 and steps 610 and 620 may be performed. However, if the neighboring base station 212 is the serving base station, then the base station 210 may not necessarily be aware. Thus, in step 605, the serving base station 210 may receive the information on the target terminal 220 from the neighboring base station 212 or from the RNC 205 before steps 610 and 620 may be performed.

Referring back to FIG. 5, if the terminal manager 350 determines in step 510 that providing the interference information will not benefit any of the mobile terminals, then the method may proceed to step 540 in which the communicator 320 may transmit the scheduled data. But if the terminal manager 350 determines that the interference information may benefit one or more of the mobile terminals, then in step 520, the interference information manager 340 may transmit, via the communicator 320, the interference information to the target terminal 220. The interference information may include the configuration information of the scheduled data. From the perspective of the target terminal 220, this implies that the interfering configuration (configuration information of stream 2) is transmitted to the target terminal 220 in step 520.

The interfering configuration may include any one or more of the following—a transport format, a modulation and coding scheme, a coding rate, a transport block size, the identity of the other terminal 222, a scrambling code, a channelization code, downlink resource elements scheduled for the other terminal 222, a category of the other terminal 222, a MIMO rank, precoding information, antenna power allocation, and HARQ redundancy version. In one embodiment, only the identity of the other terminal 222 may transmitted as the interference information in step 520. In another embodiment, the interfering configuration without the identity of the other terminal 222 may be transmitted. Of course, both may be transmitted as the interference information.

In one embodiment, the interference information may be transmitted over a signal channel as a broadcast. In this context, the broadcast may be viewed as being packaged such that a plurality of terminals are able to read the interference information. For example, in FIG. 2B, the terminals 220 and 224 are able to read the interference information.

Figure 7:
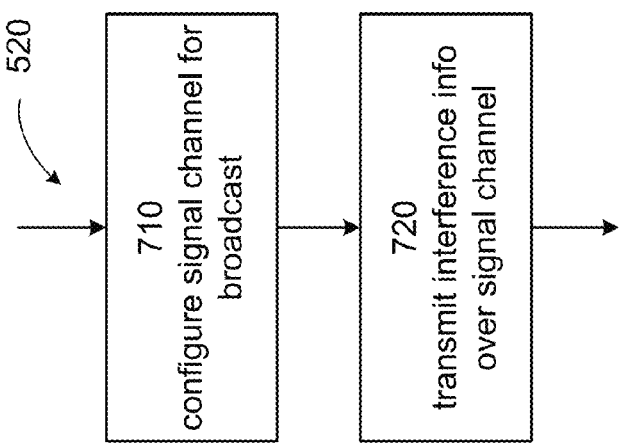
FIG. 7 illustrates a flow chart of an example process performed in a network node to transmit interference information to a target terminal.

FIG. 7 illustrates a flow chart of an example process implement step 520 by broadcasting the interference information to the target terminal 220. In step 710, the interference information manager 340 may configure the signal channel for broadcast. Then in step 720, the interference information manager 340, via the communicator 320, may transmit the interference information over the signal channel.

Recall from above that the network node 300 is assumed to transmit the configuration information to the intended mobile terminals in a conventional manner. In the conventional configuration information transmission, a shared control channel, e.g., HS-SCCH in HSPA, may be used.

In one embodiment, the interference information manager 340 may use the same shared control channel to transmit the interference information in step 720. The interference information manager 340 may include the interfering configuration in the interference information transmitted over the shared control channel. The interference information manager 340 may assign the shared control channel with a predetermined group ID to configure the shared control channel in step 710. In other words, the interference information manager 340 may generate the message—the interference information—to be transmitted over the shared control channel according to the group ID. Recall that the group ID may be understood the plurality of terminals to indicate that the interference information includes the interfering configuration.

But in another embodiment, the signal channel the interference information manager 340 uses in step 720 may be different from the shared control channel. It is possible that the interference information manager 340 can transmit the interfering configuration over this different signal channel. But as an alternative, the identity of the other terminal 222 may be included in the interference information transmitted over the signal channel, regardless of whether or not other parts of the interference configuration is included. Recall that with the identity of the other terminal 222, the target terminal 220 may eavesdrop on the conventional configuration information transmission to gather the interfering configuration.

While not specifically illustrated, instead of broadcast, the interference information manager 340 may unicast the interference information to the target terminal 220, i.e., package the interference information such that only the target terminal 220 may read the interference information. The unicast may be provided over the shared control channel (e.g., as another HS-SCCH order) or over a different signal channel.

Figure 8:
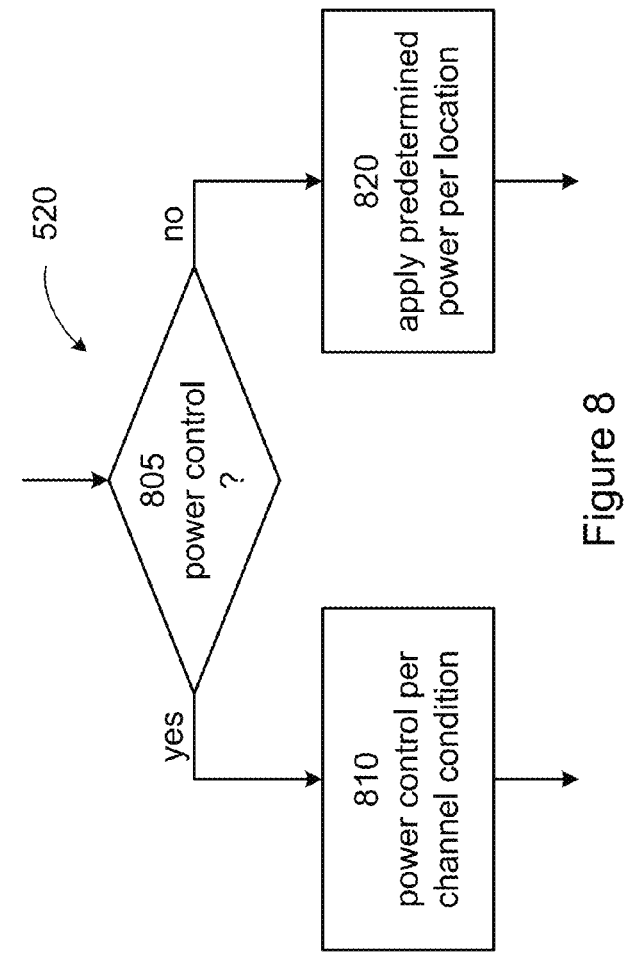
FIG. 8 illustrates a flow chart of another example process performed in a network node to transmit interference information to a target terminal.

FIG. 8 illustrates a flow chart of another example process 800 to implement the step 520 to transmit interference information to the target terminal 220. The process 800 is in regards to power controlling the transmission itself. Thus, the illustrated process 800 may be used in conjunction with the process 700 illustrated in FIG. 7. In step 805, the transmit power manager 360 may determine whether to power control the transmission of the interference information to the channel condition of the target terminal 220. For example, the transmit power manager 360 may determine that the power control should be applied if the interference information is unicasted to the target terminal 220, and may determine that predetermined power should be applied if the interference information is broadcasted. If the transmit power manager 360 determines that the power control should be applied, then in step 810, the transmit power manager 360 may power control the interference transmission to the channel condition of the target terminal 220. But in another embodiment, even if the interference transmission is broadcast, the transmit power manager 360 may still decide to apply power control. For example, the interference information may be transmitted to just a few mobile terminals.

If the transmit power manager 360 determines otherwise, then in step 820, the transmit power manager 360 may apply a predetermined power without power controlling to the channel conditions of the target terminal 220. Note that depending on the circumstances, the transmit power manager 360 may apply different predetermined power in step 820. For example, if the interference information is being transmitted only to the mobile terminals within the serving cell 230 corresponding to the base station 210, then the predetermined power that is sufficient to cover the serving cell 230, i.e., sufficient to reach an edge of the serving cell 230 may be applied. On the other hand, if any of the terminals such as the target terminal 220 receiving the interference information is in the neighboring cell 232, the predetermined power may be power sufficient to reach a portion of the neighboring cell 232. But in an embodiment, even if the transmission is a unicast, predetermined power still may applied. When the interference information is unicasted, it is preferable to power control the unicast to the channel condition of the TT. Beamforming may also be applied.

Again referring back to FIG. 5, upon determining that the target terminal 220 may benefit from the interference information in step 510, the interference information manager 340 may notify the target terminal 220 to monitor for the interference information in step 515. While step 515 is not a requirement, by having the target terminal 220 monitor for the interference information only when necessary, battery may be conserved at the target terminal 220.

In FIG. 5, the interference information manager 340 may determine whether or not the interference information may be transmitted at this time. Recall that in an embodiment, only certain predefined TTI's may be designated to schedule mobile terminals with interference cancellation capabilities. For example, the base station 210 may coordinate with other base stations 222 as to when the interference information may be transmitted. As another example, the RNC 205 may instruct the base stations 210, 212 as to when the interference information may be transmitted. In step 505, the network node 300 (e.g., RNC 205, base station 210) may determine that time has arrived. If so, other steps of the method 500 may be performed. It should be noted that the step 505 is not a requirement.

Figure 9:
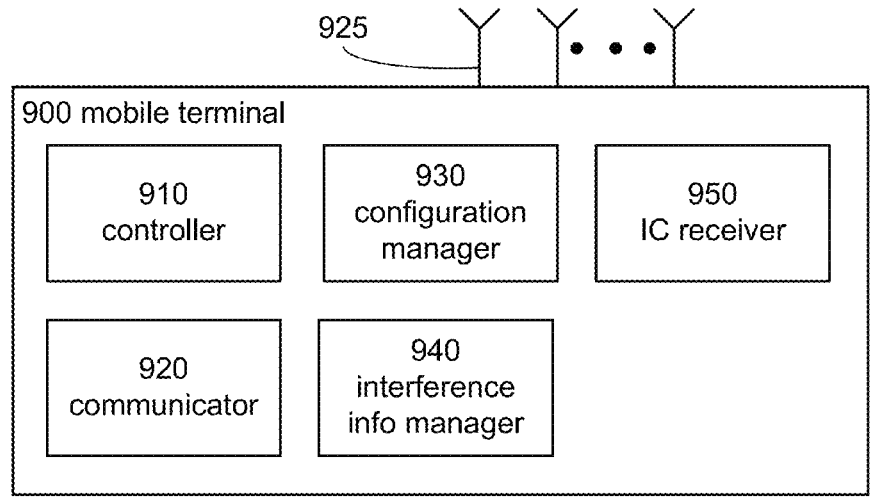
FIG. 9 illustrates an example embodiment of a mobile terminal.

FIG. 9 illustrates an example embodiment of a mobile terminal 900 with IC capability such as the target terminal 220. The IC capable terminal may comprise several devices including a controller 910, a communicator 920, a configuration manager 930, an interference information manager 940, and an IC receiver 950. The communicator 920 may be structured to communicate with other network nodes such as the base station 210 and RNC 205 (through higher layer signaling). The configuration manager 930 may be structured to manage configuration information received from the network node 300. The interference information manager 940 may be structured to manage the interference information received from the network node. The IC receiver 950 may be structured cancel interferences based on the configuration information and interference information. The controller 910 may be structured to control an overall operation of the mobile terminal 900. Examples of operations that may be performed by these devices will be described in conjunction with FIG. 12.

Figure 10:
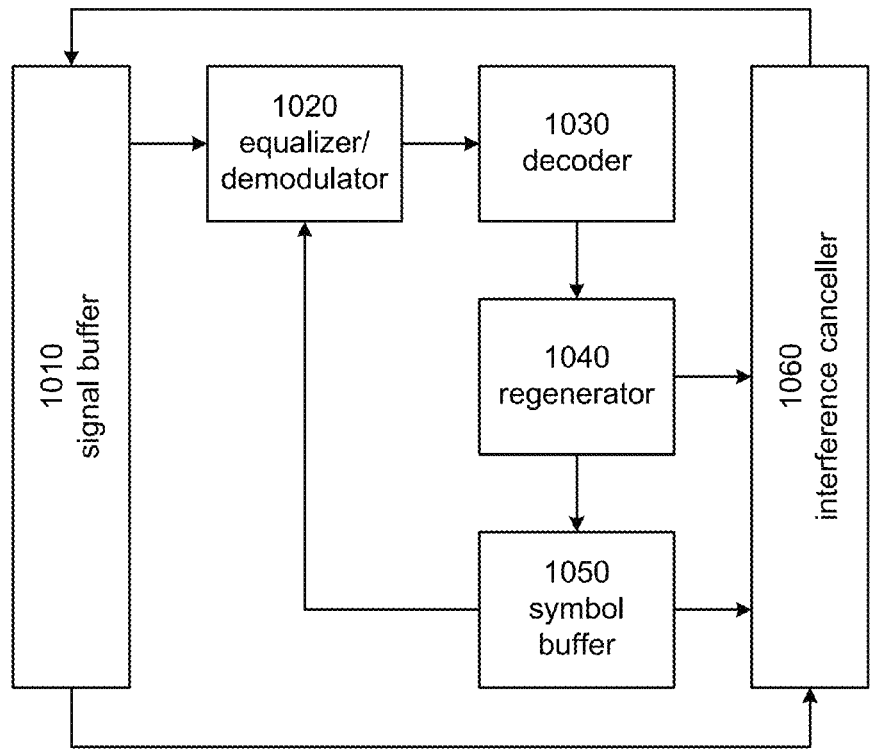
FIG. 10 illustrates an example embodiment of an interference cancelling receiver.

FIG. 10 illustrates an example embodiment of the IC receiver 950, which may comprise a signal buffer 1010, an equalizer/demodulator 1020, a decoder 1030, a regenerator 1040, a symbol buffer 1050, and an interference canceller 1060. The signal buffer 1010 may be structured to store the received signal or interference reduced versions thereof. The equalizer/demodulator 1020 may be structured to equalize and demodulate the signals stored in the signal buffer 1010. The decoder 1030 may be structured to decode the demodulated signals from the equalizer/demodulator 1020. For example, the decoder 1030 may output likelihood ratios. The regenerator 1040 may be structured to output symbols based on the decoder 1030 outputs. For example, the regenerator 1040 may output soft or hard symbol estimates. The symbol buffer 1050 may be structured to store the regenerated symbols. The interference canceller 1060 may be structured to cancel interferences. For example, the regenerator 1050 may regenerate symbols of the interfering stream. The interference canceller 1060 may subtract the regenerated interfering symbols from the received signal (e.g., the received plurality of data streams stored in the signal buffer).

In order to regenerate the interfering symbols, the components of the IC receiver 950—e.g., the equalizer/demodulator 1020, the decoder 1030, etc.—may utilize the interfering configuration—e.g., the modulation and coding scheme, coding rate, transport block size, scrambling code, channelization code, etc. to demodulate and decode the interfering stream.

Figure 11:
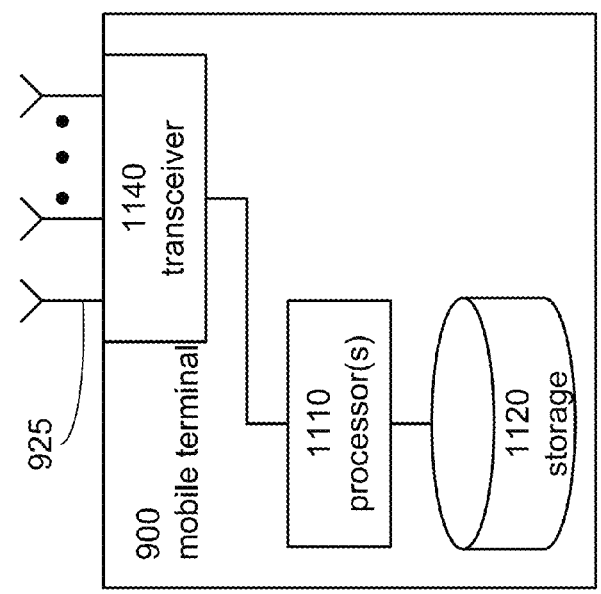
FIG. 11 another example embodiment of a mobile terminal.

FIGS. 9 and 10 provide logical views of the mobile terminal 900 and the devices included therein. It is not strictly necessary that each device be implemented as physically separate modules or circuits. Some or all devices may be combined in a physical module. Also, one or more devices may be implemented in multiple physical modules as illustrated in FIG. 11.

The devices of the mobile terminal 900 need not be implemented strictly in hardware. It is envisioned that any of the devices maybe implemented through a combination of hardware and software. For example, as illustrated in FIG. 11, the mobile terminal 900 may include one or more processors 1110 structured to execute program instructions stored in a non-transitory storage medium or in firmware (e.g., ROM, RAM, Flash) (denoted as storage 1120) to perform the operations of the network node devices. The program instructions may also be received in a transitory manner, e.g., through externally provided signals. The transceiver 1140 may be structured to receive signals from and send signals to one or more base stations 210, 212 via one or more antennas 925. The transmitter and the receiver may be implemented as physically separate devices.

Figure 12:
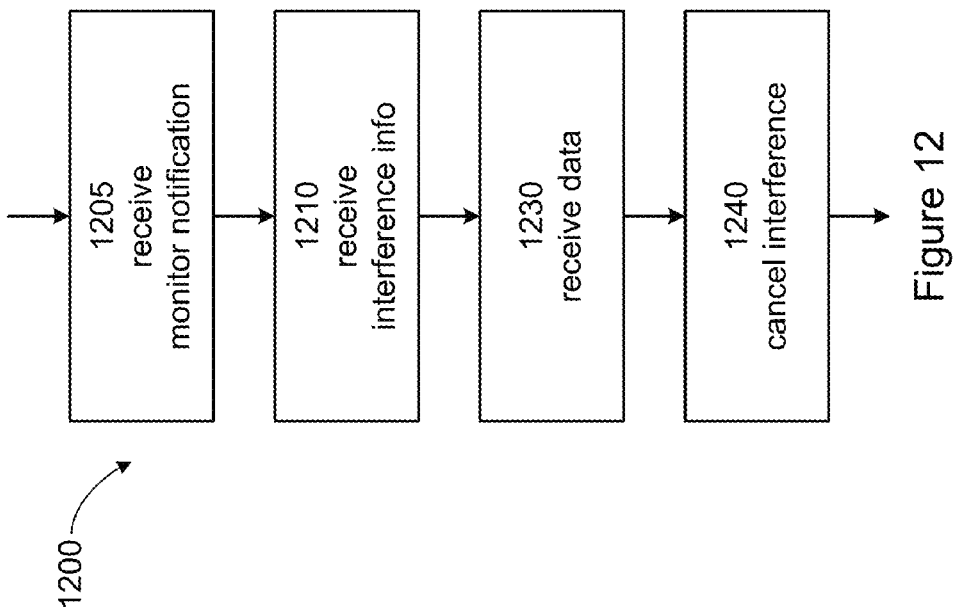
FIG. 12 illustrates a flow chart of an example method performed in a mobile terminal to cancel interferences.

FIG. 12 illustrates a flow chart of an example method performed in a mobile terminal to cancel interferences. The target terminal 220 may be an example of the mobile terminal 900. In this figure, it is assumed that the network node 300 transmits the configuration information corresponding to data streams scheduled to be transmitted to the intended mobile terminals in a conventional manner. In the mobile terminal 220, the configuration manager 930 may perform the conventional operation of listening for the configuration information intended for the target terminal 220, which may identify air interface resources allocated to the data stream intended to the target terminal 220.

In step 1210, the interference information manager 940 may receive, via the communicator 920, the interference information from the network node 300. The interference information may include the interfering configuration and/or the identity of the other terminal 222.

In step 1230, the communicator 920 may receive a plurality of data streams transmitted from the network node 300. The interfering stream may be included in the plurality of data streams. In step 1240, the IC receiver 950 may cancel the interfering stream from the plurality of data streams based on the interference information.

Figure 13:
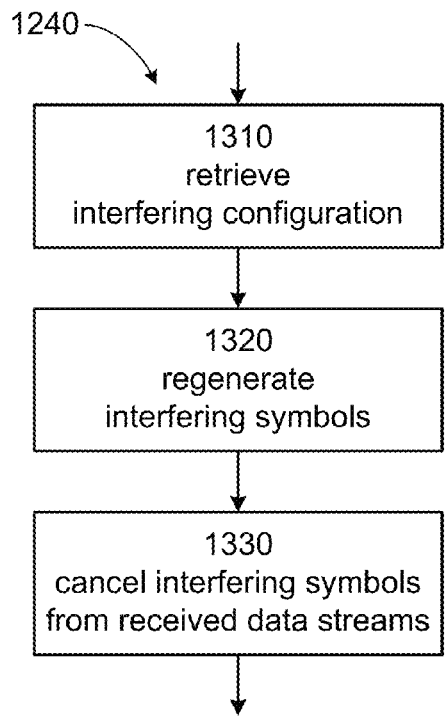
FIG. 13 illustrates a flow chart of an example process performed in a mobile terminal to cancel interferences.
Figure 14:
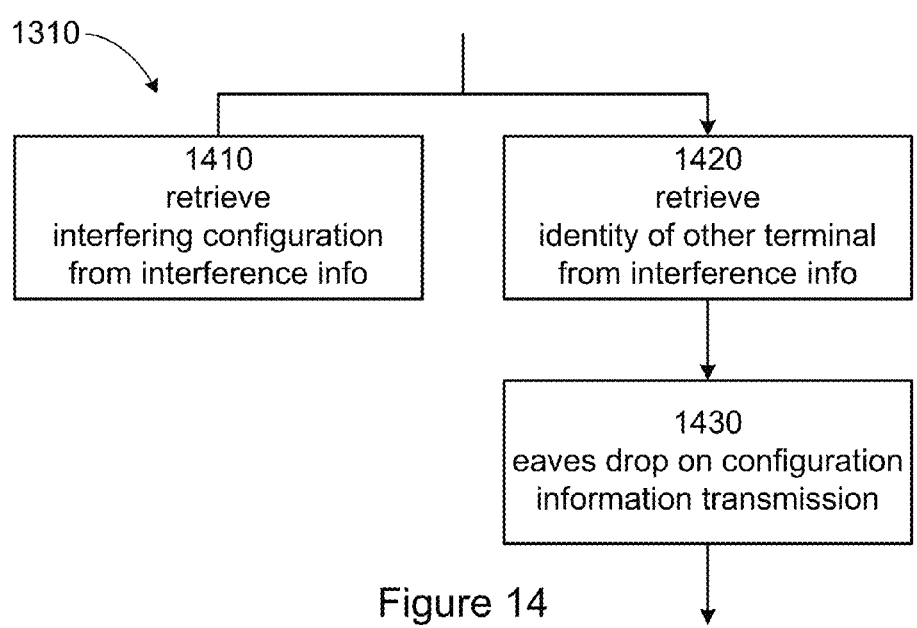
FIG. 14 illustrates a flow chart of an example process performed in a mobile terminal to retrieve interfering configuration.

FIG. 13 illustrates a flow chart of an example process performed in the target terminal 220 to implement step 1240 of canceling interferences. In step 1310, the interference information manager 940 may retrieve the interfering configuration based on the interference information. FIG. 14 illustrates example processes performed by the target terminal 220 to implement step 1310 of retrieving the interfering configuration.

Recall that interference information may be received as a broadcast over a signal channel. Also recall that in one embodiment, the signal channel may be the same as the shared control channel used by the network node 300 to transmit the configuration information. In this instance, the interfering configuration may be included in the interference information received over the shared control channel, where the interference information is generated by the network node 300 according to a predetermined group ID. To perform the step 1310, the interference information manager 940 in step 1410 may retrieve the interfering configuration based on the predetermined group ID from the interference information.

Further recall that in another embodiment, the signal channel may be different from the shared control channel. In this instance, the network node may include, at a minimum, the identity of the other terminal 222 in the interference information received over the signal channel. To perform the step 1310, the interference information manager 940 in step 1420 may retrieve the identity of the other terminal 222 from the signal channel. Then in step 1430, the interference information manager 940 may eavesdrop on the shared control channel to retrieve the interfering configuration using the identity of the other terminal 222 when the network node 300 transmits the configuration information.

In one embodiment to perform step 1240, if the interference information includes the interfering configuration, then the IC receiver 950 may reconstruct/regenerate the symbols of the interfering stream based on the interfering configuration and cancel the interfering symbols from the received plurality of data streams. In regenerating the interfering symbols, the identity of the other terminal 222 may be used (e.g., in LTE).

Referring back to FIG. 13, once the interfering configuration is retrieved, the IC receiver 950 in step 1320 may regenerate or otherwise reconstruct the symbols of the interfering stream based on the interfering configuration. Recall that the interfering stream, in addition to being encoded, may also be scrambled (e.g., LTE) based on the identity of the other stream 222. Then in an embodiment, as part of the regeneration step 1320, the IC receiver 950 may unscramble the interfering stream.

Once the symbols of the interfering stream are regenerated, the IC receiver 950 in step 1330 may cancel the regenerated symbols from the received plurality of data streams.

Note that it is possible for the target terminal 220 to receive the interference information from the network node 300, in which the network node 300 is not the serving node to the target terminal 220. See FIG. 2C.

Also, referring back to FIG. 12, the target terminal 220 may receive a notification to monitor for the interference information from the network node 300, and the interference information may be received in step 1210 in response. Again, this promotes battery savings since the interference information is monitored only when needed.

One or more aspects of the present disclosure allow interference cancellation to be made easier through providing interfering configuration to the target terminal. The helpful interference information can be delivered to the terminals efficiently in terms of both radio resource consumption and terminal battery consumption.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that its scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed by a network node of a wireless network to provide communication services to a target terminal, the method comprising:
determining whether the target terminal is in a data state;
determining whether the target terminal is interference cancellation (IC) capable;
transmitting interference information to the target terminal when it is determined that the target terminal is in the data state and further that the target terminal is IC capable; and
transmitting a plurality of data streams to one or more terminals in a cell being served by the network node,
wherein for each data stream, the network node also transmits a corresponding configuration information that identifies air interface resources allocated to that data stream,
wherein an interfering stream is a data stream intended for a terminal other than the target terminal, and an interfering configuration is the configuration information corresponding to the interfering stream, and
wherein in the step of transmitting the interference information to the target terminal, the interfering configuration and/or an identity of the terminal other than the target terminal are transmitted as the interference information;
wherein in the step transmitting the interference information to the target terminal, the interference information is broadcasted over a signal channel, the broadcast being packaged such that a plurality of terminals are able to read the interference information;
wherein the signal channel is a shared control channel used by the network node to transmit the configuration information corresponding to the data streams,
wherein in the step of transmitting the interference information to the target terminal, the interfering configuration is included in the interference information transmitted over the shared control channel, and
wherein the interference information is generated according to a predetermined group ID, the group ID being understood by the plurality of terminals to indicate that the interference information includes the interfering configuration.

2. The method of claim 1,
wherein the signal channel is different from a shared control channel used by the network node to transmit the configuration information corresponding to the data streams, and
wherein the step of transmitting the interference information to the target terminal, the identity of the terminal other than the target terminal is included in the interference information transmitted over the signal channel.

3. The method of claim 1, wherein the step of transmitting the interference information comprises one of:
power controlling the interference information broadcast to a channel condition of the target terminal; and
applying a predetermined power to the interference information broadcast without power controlling.

4. The method of claim 1, further comprising notifying the target terminal to monitor for the interference information.

5. A non-transitory computer-readable medium which has stored therein program instructions which when executed by a computer of a network node causes the computer to execute the method of claim 1.

6. A method performed by a target terminal capable of performing interference cancellation, the method comprising:
receiving a notification from a network node to monitor for interference information;
receiving the interference information from the network node;
receiving a plurality of data streams transmitted from the network node, the plurality of data streams including an interfering stream;
canceling the interfering stream from the plurality of data streams based on the interference information,
wherein for each data stream, the network node also transmits a corresponding configuration information that identifies air interface resources allocated to that data stream, wherein the interfering stream is a data stream intended for a terminal other than the target terminal which is interference cancellation (IC) capable, and an interfering configuration is the configuration information corresponding to the interfering stream, and wherein the interference information includes the interfering configuration and/or an identity of the terminal other than the target terminal;

wherein in the step receiving the interference information from the network node, the interference information is received as a broadcast over a signal channel, the broadcast being packaged such that a plurality of terminals are able to read the interference information;

wherein the signal channel is a shared control channel used by the network node to transmit the configuration information corresponding to the data streams over the shared control channel, and wherein the step of retrieving the interfering configuration comprises retrieving the interfering configuration from the interference information received over the shared control channel according to a predetermined group ID, the group ID being understood by a plurality terminals, including the target terminal, to indicate that the interference information includes the interfering configuration.

7. The method of claim 6,
wherein the step of canceling the interfering stream from the plurality of data streams comprises:
retrieving the interfering configuration based on the interference information;
regenerating symbols of the interfering stream based on the interfering configuration; and
canceling the regenerated symbols of the interfering stream from the plurality of data streams.

8. The method of claim 6,
wherein the signal channel is a different channel from a shared control channel used by the network node to transmit the configuration information corresponding to the data streams, and
wherein the step of retrieving the interfering configuration comprises:
retrieving the identity of the terminal other than the target terminal from the interference information received over the signal channel; and
eavesdropping on the shared control channel using the identity of the terminal other than the target terminal when the network node transmits the configuration information corresponding to the plurality of data streams to retrieve the interfering configuration.

9. The method of claim 6,
wherein the step of receiving the interference information is performed in response to receiving the notification.

10. A non-transitory computer-readable medium which has stored therein program instructions which when executed by a computer of a mobile terminal causes the computer to execute the method of claim 6.

11. A network node of a wireless network, the network node structured to provide communication services to a target terminal, the network node comprising:
one or more processors configured to:
determine whether the target terminal is in a data state;
determine whether the target terminal is interference cancellation (IC) capable;
transmit interference information to the target terminal when the terminal manager determines that the target terminal is in the data state and further that the target terminal is IC capable;
transmit, for each of a plurality of data streams scheduled to be transmitted, a corresponding configuration information that identifies air interface resources allocated to that data stream; and
transmit the data streams as scheduled to one or more terminals in a cell being served by the network node,
wherein an interfering stream is a data stream intended for a terminal other than the target terminal, and an interfering configuration is the configuration information corresponding to the interfering stream, and
wherein the one or more processors configured to transmit the interference information to the target terminal comprises one or more processors configured to transmit the interfering configuration and/or an identity of the terminal other than the target terminal as the interference information;
wherein the one or more processors configured to transmit the interference information to the target terminal comprises one or more processors configured to broadcast the interference information over a signal channel, the broadcast being packaged such that a plurality of terminals are able to read the interference information;
wherein the signal channel is a shared control channel used by the one or more processors to transmit the configuration information corresponding to the data streams, and
wherein the one or more processors configured to transmit the interference information to the target to terminal comprises one or more processors configured to include the interfering configuration in the interference information and to generate a message to be transmitted over the shared control channel according to a predetermined group ID, the group ID being understood by the plurality of terminals to indicate that the interference information includes the interfering configuration.

12. The network node of claim 11,
wherein the signal channel is different from a shared control channel used by the one or more processors to transmit the configuration information corresponding to the data streams, and
wherein the one or more processors configured to transmit the interference information to the target terminal comprises one or more processors configured to include the identity of the terminal other than the target terminal in the interference information transmitted over the signal channel.

13. The network node of claim 11, wherein the one or more processors configured to transmit the interference information to the target terminal comprises one or more processors configured to
power control the interference information broadcast to a channel condition of the target terminal, or
apply a predetermined power to the interference information broadcast without power controlling.

14. The network node of claim 11, wherein the one or more processors are further configured to notify the target terminal to monitor for the interference information.

15. A target terminal capable of performing interference cancellation, the target terminal comprising:
one or more processors configured to:
receive a notification from a network node to monitor for interference information;
receive the interference information from the network node;
receive a plurality of data streams transmitted from the network node, the plurality of data streams including an interfering stream; and cancel the interfering stream from the plurality of data streams based on the interference information,
wherein for each data stream, the network node also transmits a corresponding configuration information that identifies air interface resources allocated to that data stream,
wherein an interfering stream is a data stream intended for a terminal other than the target terminal, and an interfering configuration is the configuration information corresponding to the interfering stream, and
wherein the interference information includes the interfering configuration and/or an identity of the terminal other than the target terminal;
wherein the one or more processors configured to receive interference information from the network node comprises one or more processors configured to
receive the interference information from the network node as a broadcast over a signal channel, the broadcast being packaged such that a plurality of terminals are able to read the interference information,
wherein the signal channel is a shared control channel used by the network node to transmit the configuration information corresponding to the data streams over the shared control channel, and
wherein the one or more processors configured to retrieve the interfering configuration an interference manager is structured to comprises one or more processors configured to retrieve the interfering configuration from the interference information received over the shared control channel according to a predetermined group ID, the group ID being understood by a plurality terminals, including the target terminal, to indicate that the interference information includes the interfering configuration.

16. The target terminal of claim 15,
wherein the one or more processors configured to receive interference information from the network node comprises one or more processors configured to
retrieve the interfering configuration based on the interference information, and
wherein the one or more processors configured to cancel the interfering stream from the plurality of data streams comprises one or more processors configured to
regenerate symbols of the interfering stream based on the interfering configuration, and
cancel the regenerated symbols of the interfering stream from the plurality of data streams.

17. The target terminal of claim 16,
wherein the signal channel is different from a shared control channel used by the network node to transmit the configuration information corresponding to the data streams over the shared control channel, and
wherein the one or more processors configured to retrieve the interfering configuration, comprises one or more processors configured to retrieve the identity of the terminal other than the target terminal from the interference information received over the signal channel, and
eavesdrop on the shared control channel using the identity of the terminal other than the target terminal when the network node transmits the configuration information corresponding to the plurality of data streams to retrieve the interfering configuration.

18. The target terminal of claim 15, wherein the one or more processors configured to receive interference information from the network node are further configured to
receive the interference information in response to the notification from the network node to monitor for the interference information.

* * * * *